Patented Jan. 14, 1930

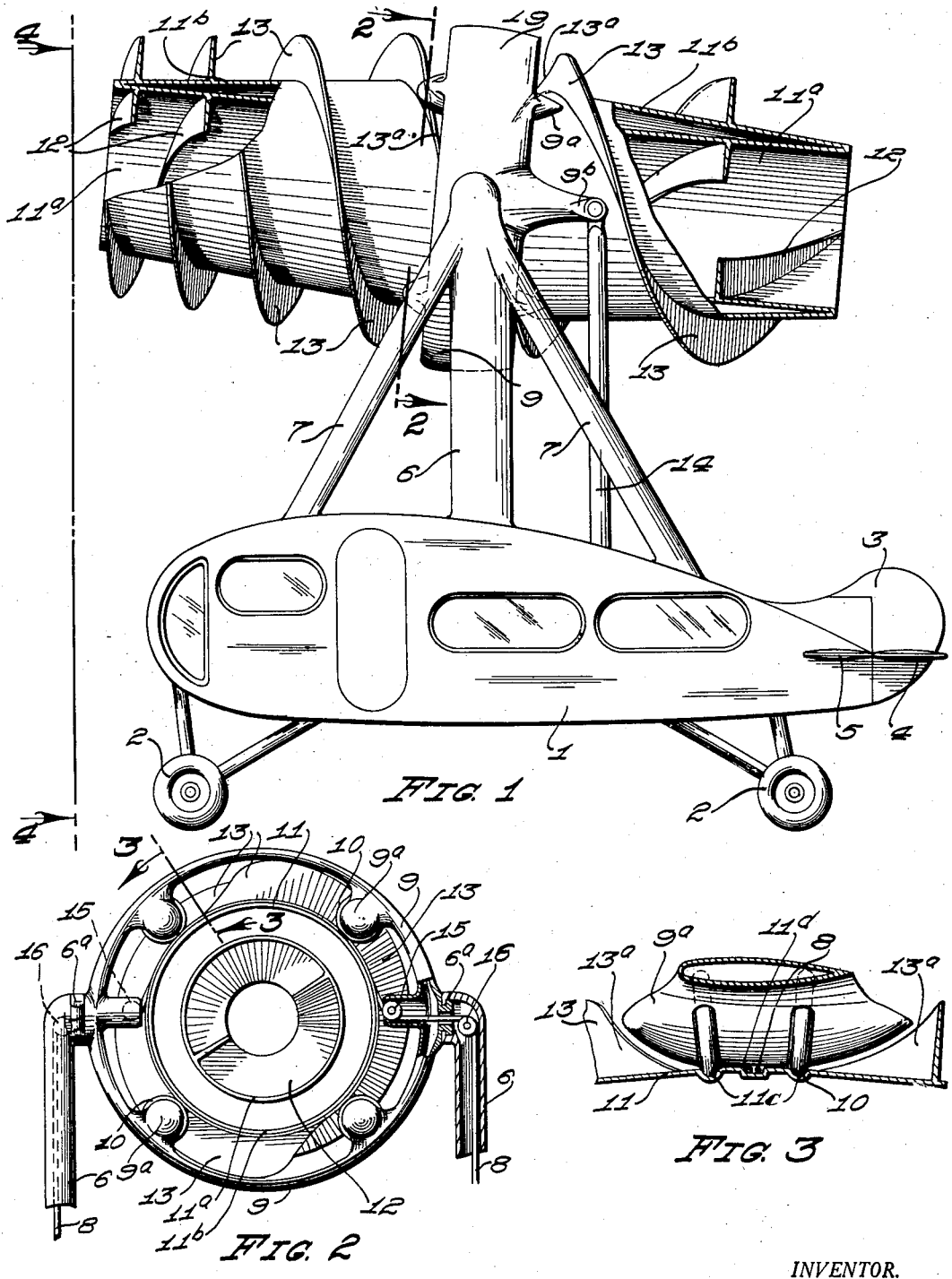

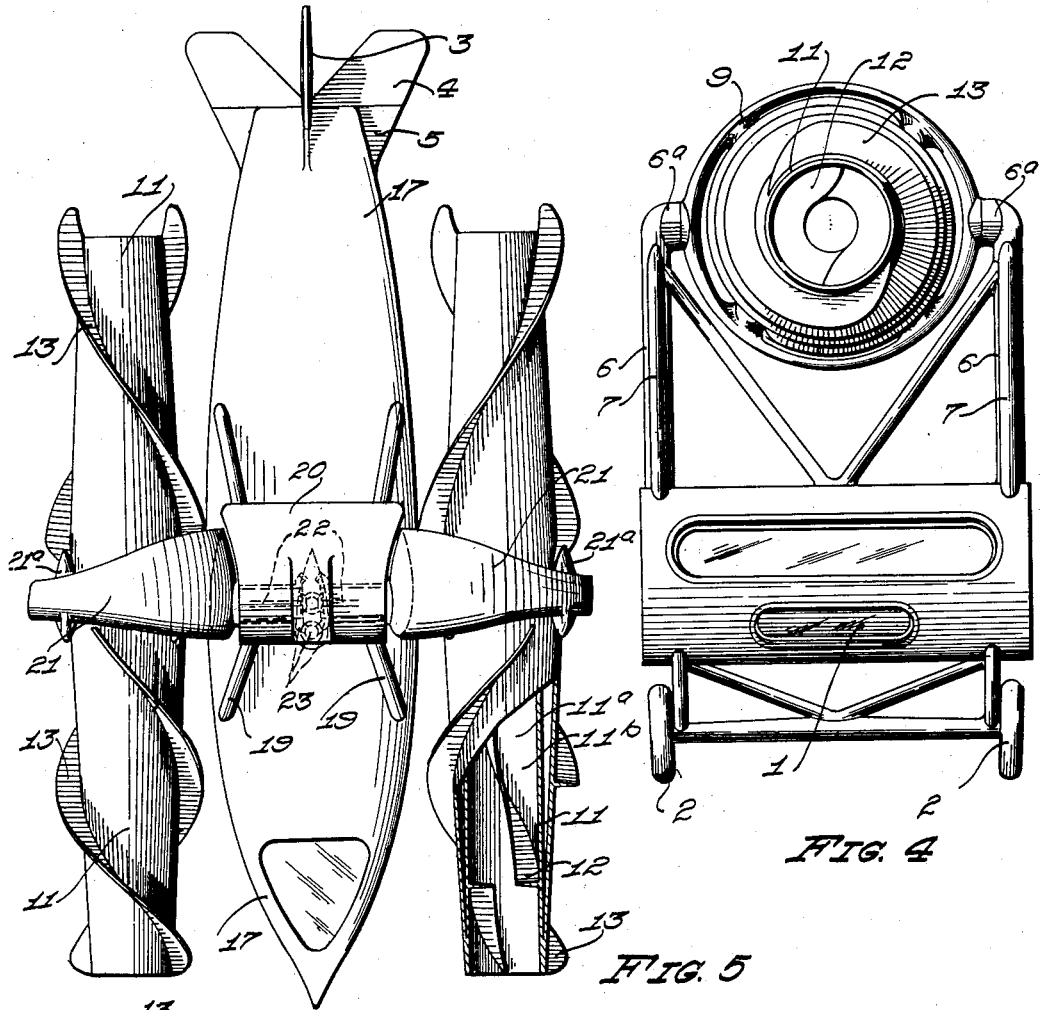
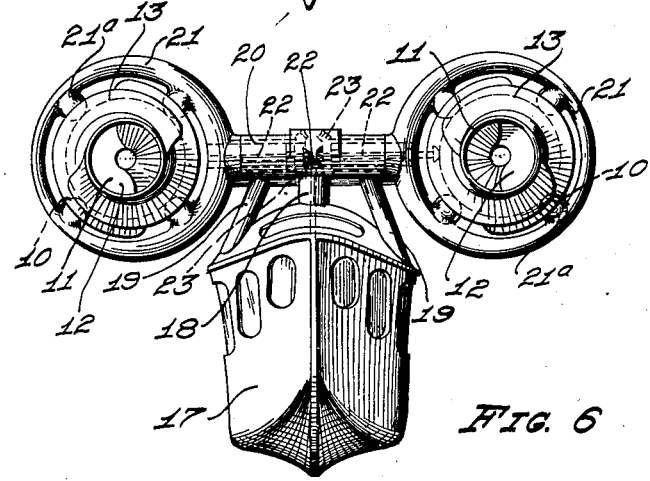

1,743,467

UNITED STATES PATENT OFFICE

PAUL MAIWURM, OF SAN DIEGO, CALIFORNIA, ASSIGNOR OF TEN PER CENT TO JOHN C. TWELKER, OF SAN DIEGO, CALIFORNIA

AIRCRAFT

Application filed May 31, 1928. Serial No. 281,908.

My invention relates to aircraft and the objects of my invention are: first, to provide an aircraft in which the sustaining surface and propulsion means are combined; second, to provide an aircraft in which substantially helical fins are secured to the outer and inner sides of a revoluble tube member for directing and maintaining an aircraft in flight; third, to provide an aircraft which concentrates the lifting area of an aircraft thereby providing aircraft of large carrying capacity proportional to its size; fourth, to provide an aircraft which may be sustained, propelled and directed in flight by a plurality of combined sustaining and propulsion means connected thereto; fifth, to provide an aircraft in which the propelling means may revolve at a moderate speed and yet maintain the aircraft in rapid flight; sixth, to provide an aircraft sustaining and propelling means which is applicable to all kinds of aircraft; seventh, to provide a propulsion and sustaining means which may be used as auxiliary sustaining and propulsion means for the conventional aircraft, such as airplane or dirigible; eighth, to provide an aircraft in which a revoluble movement of propulsion means forms a sustaining means and in which a pivotal movement of said propulsion means directs the aircraft; ninth, to provide a combined aircraft sustaining and propulsion means consisting of a tubular member having helical ridges on its inner and outer surfaces and pivotally and revolubly connected with an aircraft for maintaining and directing said aircraft in flight; tenth, to provide an aircraft of this class which is very compact and easy to store; eleventh, to provide an aircraft of this class that is very simple to operate and twelfth, to provide an aircraft and aircraft propulsion and direction means which is exceedingly simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of one form of my aircraft with parts and portions broken away and in section to facilitate the illustration; Fig. 2 is a transverse sectional view through 2—2 of Fig. 1 with parts and portions in elevation to facilitate the illustration; Fig. 3 is an enlarged sectional view of the propulsion tube supporting means through the line 3—3 of Fig. 2 with the propulsion tube and its external fins shown fragmentarily; Fig. 4 is a front elevational view from the line 4—4 of Fig. 1; Fig. 5 is a top or plan view of a slight modification of my aircraft and propulsion means with parts and portions in section to facilitate the illustration; and Fig. 6 is a front elevational view thereof.

The fuselage 1, landing wheels 2, rudder 3, elevators 4, stabilizers 5, supporting struts 6, bracing struts 7, cable 8, circular frame 9, propulsion tube supporting wheels 10, propulsion tube member 11, inner fins 12, outer fins 13, rod 14, rollers 15 and 16, fuselage 17, struts 18 and 19, cross member 20, ring frame 21, gear and shaft mechanism 22 and pivoting gear means 23, constitute the principal parts and portions of my aircraft structure.

In the structure shown in Figs. 1 through 4, my aircraft consists of a fuselage 1, having suitable landing wheels 2. The rear portion of the fuselage is provided with a conventional rudder 3, elevators 4 and stabilizers 5. A pair of supporting struts 6 are secured to the upper surface of the fuselage 1 in approximate alinement with its normal center of gravity. Suitable bracing struts 7 support the upright struts 6 in rigid vertical relation. The struts 6 are hollow for receiving cables 8 to be described later. The upper extremity of each supporting strut 6 is provided with a bearing portion 6$^a$.

Journaled between the bearings 6$^a$ is a circular frame 9 which is relatively broad and flat with stream line surfaces. The circular frame 9 is adapted to support on the inner side thereof inwardly extending propulsion tube supporting wheels 10 which are arranged in pairs and in spaced relation to each other. The inner edges of the wheels 10 are equidistant from a common center and are adapted to revolubly support a propulsion tube member 11. The circular frame member 9 is provided with suitable shielding means 9ª which are adapted to cover the sides and stream line the wheels 10.

The propulsion tube member 11 consists of an inner shell portion 11ª which has a constant diameter, and an outer shell portion 11ᵇ consisting of a pair of tapered truncated cone like members joined together at their larger ends. The jointed ends of the outer shell members are coincident with the transverse median line of the inner shell portion 11ª and are spaced apart therefrom. Their extended, smaller ends are secured to the ends of the inner shell, as shown best in Fig. 1 of the drawings. Grooves 11ᶜ are provided in the outer shell 11ᵇ for guiding the wheels 10, thereby permitting said wheels to rigidly support the propulsion tube.

The inner shell 11ª of the propulsion tube 11 is provided with one or more helical extending fins 12 which preferably increase in pitch from the forward towards the rear end of the propulsion tube. Similarly the outer shell 11ᵇ is provided with one or more helical fins 13 which also increase in pitch from the forward to the rear end thereof. A break is provided in the central portion of the outer fins 13 for the wheels 10 and the casing 9ª. The ends 13ª of the fins 13, adjacent to the wheels 10 are curved under the ends of the casing 9ª as close thereto as possible so as to reduce the break in the fins 13.

An arm 9ᵇ extends from the side of the circular frame 9 adjacent to the outer periphery of the fins 13. The end of the arm 9ᵇ is connected to a rod 14 which extends into the craft and is secured to suitable control mechanism, not shown. Movement of the arm 9ᵇ causes the circular frame 9 and the propulsion tube 11 to pivot about a transverse axle.

The propulsion tube 11 is rotated by means of the cable 8 which is wrapped once or twice around the central portion thereof in a groove 11ᵈ between the wheels 10. The ends of the cable pass over pulleys 15 which direct the cable along the pivotal axis of the circular frame 9, as shown best in Fig. 2 of the drawings. Other pulleys 16 are provided in the hollow supporting struts 6 which direct the cables 8 into the fuselage and to a suitable motor, not shown.

In the modified form shown in Fig. 6 the fuselage 17 is in a form similar to a conventional flying boat hull. In this structure struts 18 and 19 support a transversely extending and substantially horizontal cross member 20 which may simulate the conventional airplane wing. The cross member 20 forms bearings for a pair of ring frames 21. These ring frames 21 are similar to the circular frame 9 except that they are supported at the one side thereof. The ring frames 21 are provided with propulsion tube supporting wheels 10 stream lined by a casing 21ª similar to the before described structure.

The supporting wheels 10 revolubly support propulsion tubes 11 having the inner helical extending fins 12 and the outer extending fins 13, as described in the first structure. The propulsion tubes 11 may be revolved by any suitable means such as the cable mechanism described in the preceeding structure, or by other means such as the gear and shaft mechanism 22, shown by Fig. 6 of the drawings.

The ring frames 21 and the propulsion tubes 11 are pivoted by gear means 23 mounted in the cross member 20. The power for the propulsion tube rotating mechanism is transmitted through the bearing portions of the ring frame 21, which are hollow, and between the ring gears 23ª which form a part of the pivoting mechanism for the frames 21.

In either of the structures, rotation of the propulsion tubes 11 causes a pressure to be built up on the rear sides of the fins 12 and 13 and a partial vacuum on the forward side thereof, thus causing the aircraft to move forward, or, in case the propulsion tubes are tilted, to move upward.

In taking off the propulsion tubes are tilted at a considerable angle relative to the fuselage or boat hull and revolve causing the aircraft to move forward and upward in much the same manner as a conventional airplane but with a much more rapid take-off as it can be readily seen that this aircraft does not have to move forward in order to create the lifting force. As the aircraft obtains the proper elevation, the propulsion tubes 11 are turned to an approximately horizontal position or to such an angle that the sustaining force is equal to the weight of the aircraft. The pivotal movement of the propulsion tubes directs the horizontal flight of the aircraft, while the rotation thereof sustains and propels it. The conventional rudder is used for lateral movement and the conventional elevators are used to make slight movement of the aircraft.

It will be noted that several of these propulsion tubes and their supporting and driving mechanisms could be mounted in tandem along the sides or above the fuselage or hull of an aircraft.

It is obvious from the structure as illustrated in the drawings and described in the foregoing specification that there is provided an aircraft as aimed at and set forth in the objects of the invention and though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a propulsion means for aircraft, an inner tube member, an outer tube member spaced apart from said inner tube member at its central portion and joining said inner tube member at the ends thereof, substantially helical fins secured to the inner surface of said inner tube, and means for revolving said propulsion means.

2. In a propulsion means for aircraft, an inner tube member, an outer tube member spaced apart from said inner tube member at its central portion and joining said inner tube member at the ends thereof, substantially helical fins secured to the inner surface of said inner tube, other helical fins secured to the outer periphery of said outer tube, and means for revolving said propulsion means.

3. In a propulsion means for aircraft, an inner tube member, an outer tube member spaced apart from said inner tube member at its central portion and joined to said inner tube member at the ends thereof, substantially helical fins secured to the outer periphery of said outer shell, and means for revolving said propulsion means.

4. In a propulsion means for aircraft, a tube member, substantially helical fins secured to the surface thereof, a circular frame for revolubly supporting said tube member, means for pivotally supporting said circular frame, drive means for rotating said tube member and other means for pivoting said circular frame.

5. In an aircraft, a plurality of tube members, substantially helical fins secured to the surfaces thereof, a circular frame for revolubly mounting said tube members, means for pivotally connecting said circular frame to said aircraft, drive means for rotating said tube members.

6. In an aircraft, a plurality of tube members, substantially helical fins secured to the surfaces thereof, a circular frame for revolubly mounting said tube members, means for pivotally connecting said ring member to said aircraft, drive means for rotating said tube members, said tube members forming the sustaining and propulsion means of said aircraft.

7. In a propulsion means for aircraft, a relatively long tube having a bore of constant diameter and a tapered outer surface thickened at its central portion and tapered towards its ends, inwardly extending helically positioned fins secured to the surface of said bore, other outwardly extending helically positioned fins secured to the outer surface of said tube and extending from the ends to near the central portion thereof, a circular frame for revolubly mounting said tube member, support members secured to an aircraft fuselage for pivotally supporting said circular frame, means for rotating said tube member, other means for pivoting said circular frame.

8. In an aircraft structure, a relatively long tube having a bore of constant diameter and a tapered outer surface thickened at its central portion and tapered towards its ends, inwardly extending helically positioned fins secured to the surface of said bore, other outwardly extending helically positioned fins secured to the outer surface of said tube and extending from the ends to near the central portion thereof, a circular frame for revolubly mounting said tube member, support members secured to an aircraft fuselage for pivotally supporting said circular frame, means for rotating said tube member, other means for pivoting said circular frame.

9. In an aircraft structure, a relatively long tube having a bore of constant diameter and a tapered outer surface thickened at its central portion and tapered towards its ends, inwardly extending helically positioned fins secured to the surface of said bore, other outwardly extending helically positioned fins secured to the outer surface of said tube and extending from the ends to near the central portion thereof, a ring frame for revolubly mounting said tube member, support members secured to an aircraft fuselage for pivotally supporting said ring frame, means for rotating said tube member, other means for pivoting said ring frame, said tube member and the fins thereon forming a propulsion and sustaining means for said aircraft.

10. In an aircraft structure, a fuselage and a spiral surfaced revoluble tube pivotally connected thereto on a transverse axis.

In testimony whereof, I have hereunto set my hand at San Diego, California, this 24th day of May, 1928.

PAUL MAIWURM.